United States Patent
Arita

(10) Patent No.: US 9,625,750 B2
(45) Date of Patent: Apr. 18, 2017

(54) DISPLAY DEVICE

(71) Applicant: Mitsubishi Electric Corporation, Tokyo (JP)

(72) Inventor: Kenji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/730,898

(22) Filed: Jun. 4, 2015

(65) Prior Publication Data

US 2015/0355497 A1  Dec. 10, 2015

(30) Foreign Application Priority Data

Jun. 10, 2014 (JP) .................................. 2014-119168

(51) Int. Cl.
*G02F 1/1333* (2006.01)
*F21V 8/00* (2006.01)
*G02F 1/1335* (2006.01)

(52) U.S. Cl.
CPC ....... *G02F 1/133308* (2013.01); *G02B 6/009* (2013.01); *G02B 6/0068* (2013.01); *G02F 1/133615* (2013.01); *G02F 1/133512* (2013.01); *G02F 2001/13332* (2013.01); *G02F 2001/133314* (2013.01); *G02F 2201/46* (2013.01); *G02F 2201/465* (2013.01)

(58) Field of Classification Search
CPC ................................................ G02F 1/133615
See application file for complete search history.

(56) References Cited

U.S. PATENT DOCUMENTS

| | | | | |
|---|---|---|---|---|
| 8,009,245 B2* | 8/2011 | Kim | ..................... | G02B 6/0068 250/200 |
| 8,384,850 B2* | 2/2013 | Kuwajima | ........... | G02B 6/0068 349/58 |
| 9,019,441 B2* | 4/2015 | Iwamoto | ........... | G02F 1/133308 349/58 |
| 9,025,104 B2* | 5/2015 | Hsiao | ................ | G02F 1/133308 349/58 |
| 9,030,621 B2* | 5/2015 | Kim | ..................... | G02B 6/0085 349/161 |
| 9,140,918 B2* | 9/2015 | Huang | .............. | G02F 1/133512 |

(Continued)

FOREIGN PATENT DOCUMENTS

JP  2011-95533 A  5/2011

*Primary Examiner* — Phu Vu
(74) *Attorney, Agent, or Firm* — Studebaker & Brackett PC

(57) ABSTRACT

A display device includes a first housing containing a display panel between a backlight and the first housing, the backlight includes a light source substrate, and a second housing that holds the light source substrate, the second housing includes a back surface portion and a first side wall portion protruded in a front surface direction of the backlight from the back surface portion, the light source substrate is fixed to an inside of the first side wall portion, an opening is provided in the first side wall portion so as to overlap the light source substrate, the first housing includes a front surface frame portion and a second side wall portion protruded in a back surface direction of the backlight from the front surface frame portion, a projected portion is provided in an inside of the second side wall portion, and the projected portion is fitted into the opening.

7 Claims, 6 Drawing Sheets

(56) References Cited

U.S. PATENT DOCUMENTS

| | | | |
|---|---|---|---|
| 2008/0088769 A1* | 4/2008 | Kim | G02B 6/0068 349/61 |
| 2009/0185103 A1* | 7/2009 | Han | G02B 6/0088 349/58 |
| 2009/0237587 A1* | 9/2009 | Won | G02B 6/0081 349/58 |
| 2014/0028948 A1* | 1/2014 | Hsiao | G02F 1/133308 349/58 |

* cited by examiner

DISPLAY DEVICE

BACKGROUND OF THE INVENTION

Field of the Invention

The present invention relates to a display device.

Description of the Background Art

With recent spread of information electronic equipment, a thin, lightweight display device has been used as a display for a portable telephone or a personal computer, various devices used for industrial applications, an in-vehicle display, a handy terminal, and an advertisement display in various fields.

In the in-vehicle applications, the display devices are used all day and all night. A front surface housing (a cover) and a backlight making up a display device are fixed by respective engagement portions. A structure that fixes the front surface housing and the backlight is disclosed, for example, in Japanese Patent Application Laid-Open No. 2011-95533. According to an electrooptical device of Japanese Patent Application Laid-Open No. 2011-95533, obliquely upward hook portions are formed by cutting and raising work to side plate portions of an upper frame, and obliquely downward hook portions are formed by cutting and raising work to side plate portions of a lower frame opposed to the side plate portions of the upper frame.

Conventionally, openings for forming the engagement portions are provided in a back surface housing of the backlight that emits light. There has been a problem that the light passing through these openings is propagated inside a production housing, which deteriorates display quality. Moreover, there is also a problem that the light passing through these openings leaks outside.

As a measure, there is a method of closing gaps of the openings with a tape or the like for light shielding to prevent the leaking light from the openings of the display device. However, there is a problem that sticking the tape increases manufacturing processes. Moreover, there arises a problem that a material cost is increased by the tape.

SUMMARY OF THE INVENTION

An object of the present invention is to provide a display device that reduces leaking light from an engagement portion between a housing and a backlight.

A display device according to the present invention includes a backlight, a display panel, and a first housing containing the display panel between the backlight and the first housing. The backlight includes a light source substrate on which a light source is mounted, a second housing that holds the light source substrate, and a light-guiding plate contained in the second housing. The second housing includes a back surface portion and a first side wall portion protruded in a front surface direction of the backlight from the back surface portion. The light source substrate is fixed to an inside of the first side wall portion, and an opening is provided in the first side wall portion so as to overlap the light source substrate fixed to the first side wall portion. The opening is provided away from the back surface portion. The first housing includes a front surface frame portion and a second side wall portion protruded in a back surface direction of the backlight from the front surface frame portion. A projected portion is provided in an inside of the second side wall portion. The projected portion of the second side wall portion is fitted into the opening of the first side wall portion, by which the first housing is fixed to the second housing.

According to the display device according to the present invention, the opening is provided in the first side wall portion so as to overlap the light source substrate fixed to the first side wall portion, and the opening is provided away from the back surface portion. Thus, light of the light source mounted on the light source substrate can be restrained from leaking to the outside of the display device from a fitting portion between the opening and the projected portion.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
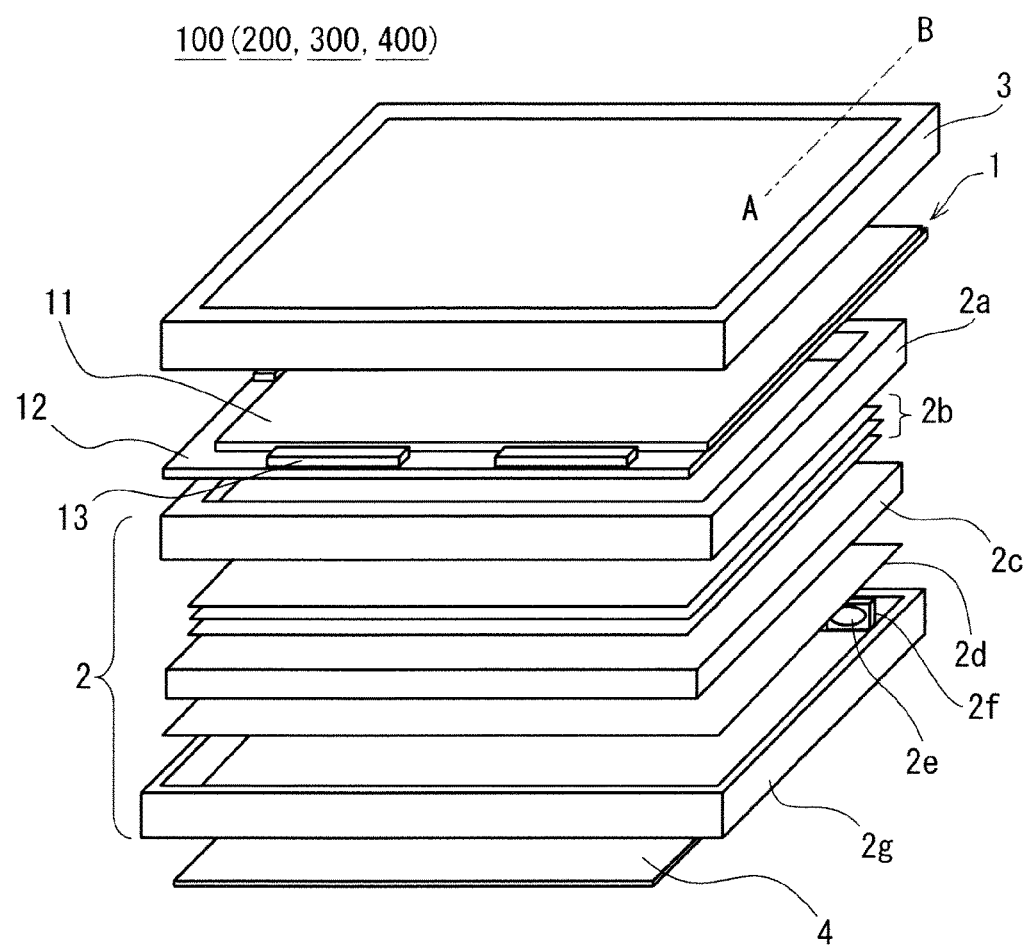
FIG. 1 is an exploded perspective view of a display device according to a first preferred embodiment.

FIG. 1 is an exploded perspective view of a display device 100 in a first preferred embodiment. As shown in FIG. 1, the display device 100 includes a display panel 1, a backlight 2, a first housing 3, and a circuit board 4. The display panel 1 includes a liquid crystal display panel to display an image. The backlight 2 irradiates a back surface of the display panel 1 with planar light. The first housing 3 contains the display panel 1, the backlight 2, and the circuit board 4.

Moreover, on a front surface of the display panel 1, a touch panel to perform positional signal input to a screen from outside and an almost transparent protecting member to protect the touch panel (neither of which is shown) are provided. Moreover, on a back surface of the display device 100, a cover (not shown) to protect the circuit board 4 may be provided.

First, with a configuration of the display device 100, respective components will be described. The display panel 1 includes a transmissive or transflective liquid crystal display panel. The liquid crystal display panel includes first and second substrates 11, 12. In the first substrate 11, birefringence of liquid crystal is applied, and a color filter, a light-shielding layer, a counter electrode and the like are formed on an insulating substrate such as glass. In the second substrate 12, thin film transistors (TFTs) which are switching elements, pixel electrodes and the like are formed on an insulating substrate such as glass.

Moreover, the display panel 1 includes ICs for driving 13 to drive the first and second substrates 11, 12. The ICs for driving 13 are provided in an outer circumferential portion of the second substrate 12. The ICs for driving 13 may be arranged on a tape-like wiring material (e.g., TCP, COF or the like) connected to the outer circumferential portion of the second substrate 12.

Moreover, although not shown, the display panel 1 includes a spacer to hold an interval between the first substrate 11 and the second substrate 12, a seal material to sticking the first substrate 11 and the second substrate 12, the liquid crystal sandwiched between both the substrates, a sealing material of an inlet to infuse the liquid crystal, an alignment film that aligns the liquid crystal, polarizing plates (not shown) arranged on surface of both the substrates and the like.

The backlight 2 includes a light source substrate 2f, a light-guiding plate 2c, optical sheets 2b, a reflective sheet 2d, and second and third housings. Light sources 2e are mounted on the light source substrate 2f. The light-guiding plate 2c propagates the light of the light sources 2e entering from a side surface to a front surface. The optical sheets 2b are arranged in a front surface (light-emitting surface) of the light-guiding plate 2c to control distribution and spread of light emitted from the light-guiding plate 2c. The reflective sheet 2d reflects, to a front surface side of the light-guiding plate 2c, the light coming out on a back surface side of the light-guiding plate 2c.

A second housing 2g is a housing on a back surface side of the backlight 2, and a third housing 2a is a housing on a front surface side of the backlight 2. The second housing 2g and the third housing 2a contain the light source substrate 2f, the light-guiding plate 2c, the optical sheets 2b, and the reflective sheet 2d therebetween. The backlight 2 irradiates the display panel 1 with the light from a back surface side of the second substrate 12.

As each of the light sources 2e, a point LED light source in RGB (Red, Green, and Blue, light's three primary colors). The light source 2e may be an LED or a fluorescent tube lamp in a luminescent color other than RGB (not shown). The light sources 2e (e.g., the point LED light sources) are mounted on the light source substrate 2f. The light source substrate 2f is, for example, a glass epoxy resin substrate. Moreover, as the light source substrate 2f, a flexible flat cable may be used. Further, in order to increase heat dissipation, a substrate with metal such as aluminum or ceramic used as base may be used.

The light-guiding plate 2c is made up of transparent acrylic resin, polycarbonate resin, glass or the like. In a plane of the light-guiding plate 2c, a dot pattern for scattering and a prism are provided to adjust an intensity distribution of the light and a light-emission direction in the plane.

Furthermore, the optical sheets 2b are arranged on the light-guiding plate 2c in order to adjust the intensity distribution and an outgoing angle of outgoing light. The optical sheets 2b are a lens sheet for the purpose of light concentration, a diffusion sheet for the purpose of light homogenization, a viewing angle adjustment sheet that adjusts brightness in a viewing angle direction and the like. A required number of the optical sheets 2b in accordance with the purposes are arranged.

The third housing 2a (the front surface housing of the backlight 2) has an opening portion to emit light from an outgoing surface of the light-guiding plate 2c. The display panel 1 is arranged on a front surface side of the third housing 2a. A material of the third housing 2a is metal such as aluminum, stainless steel, iron and the like, or a resin material such as PC (Polycarbonate) and ABS (Acrylonitrile Butadiene Styrene).

In the second housing 2g (a back surface housing of the backlight 2), the light sources 2e and the light source substrate 2f are positioned and held, and in order to conduct heat radiated from the light sources 2e, it is desirable to use metal high in heat conductivity. Particularly, an aluminum or aluminum alloy housing, which is high in heat conductivity, is used to efficiently radiate the heat from the light source 2e, which can prevent the heat from being accumulated.

While the second housing 2g and the third housing 2a are generally fixed to each other by a hooking structure with claws, or by screwing to hold other backlight members, the display panel 1, the circuit board 4 and the like, a structure in which both the housings are integrated may be employed.

The first housing 3 is a frame-like member that holds the display panel 1, the backlight 2, the touch panel, a protective member (not shown) and the like. The first housing 3 is a thin plate made of a metal or resin material. The first housing 3 is fixed to the backlight 2 by a claw-like fixing structure. Fixing between the first housing 3 and the backlight 2 will be described later. The first housing 3 may be formed integrally, or may be made up by combining a plurality of members. Moreover, in side surfaces, a front surface, a back surface, a peripheral portion or the like of the first housing 3, attachment portions (screws, attachment holes or the like) to a final product may be provided.

The circuit board 4 controls the display panel 1 and the light sources 2e arranged in the light source substrate 2f by electrical signals. Generally, as the circuit board 4, a copper pattern is formed on a substrate of glass epoxy or the like, and electronic components are mounted on a surface by solder. The circuit board 4 is arranged and fixed on a back surface side of the display device 100 (a side where the light is not emitted). A configuration may be employed in which the display panel 1 includes the circuit board 4. In this case, the electronic components may be mounted on the above-described FPC to obtain the function of the circuit board 4.

Moreover, in order to protect the circuit board 4 from external pressure and static electricity, a protective cover made of a plate-like metal of aluminum, stainless steel, a zinc-coated steel sheet and the like may be attached to the circuit board 4. The protective cover may be made of film-like thin resin such as PET (Polyethylene terephthalate) in place of being made of the above-described metal. When the metal protective cover is used, in order to avoid electrical contact with the circuit board 4 and the electronic components on the circuit board 4, it is desirable to take an insulation measure by sticking a sheet made of resin such as PET on the side of the circuit board 4.

The touch panel (not shown) arranged on the front surface of the display panel 1 includes a circuit by transparent electrodes formed on a transparent substrate. The touch panel converts information of positional coordinates inputted externally (by a user) to an electrical signal to transmit the signal to a control circuit of the final product through an output wiring portion connected to an end portion. As the output wiring portion, while an FPC (Flexible Printed Circuit) in which wiring is formed on a film-like base material is used because of a high freedom degree of connection attributed to thinness and flexibility thereof, a different material and structure may be employed, as long as they have similar functions and characteristics.

Moreover, the touch panel may include, on a front surface side thereof, the protective member (not shown) made of a transparent material such as glass and plastic in order to prevent damage, deformation, wear, dirt and the like by pressurization and contact from an input surface side, and printing can be added to a peripheral portion of a front surface or a back surface of the protective member for the purpose of light shielding or design.

Figure 2:
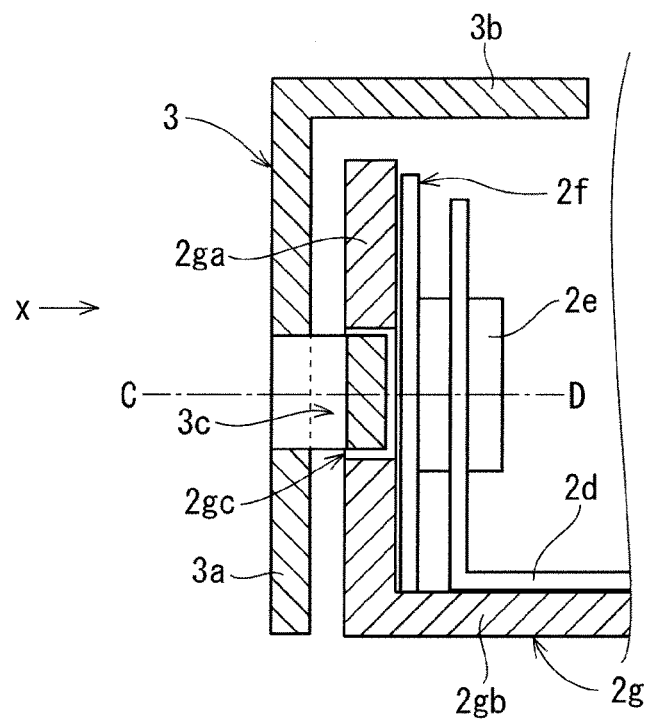
FIG. 2 is a cross-sectional view of the display device according to the first preferred embodiment along a line AB in FIG. 1.
Figure 3:
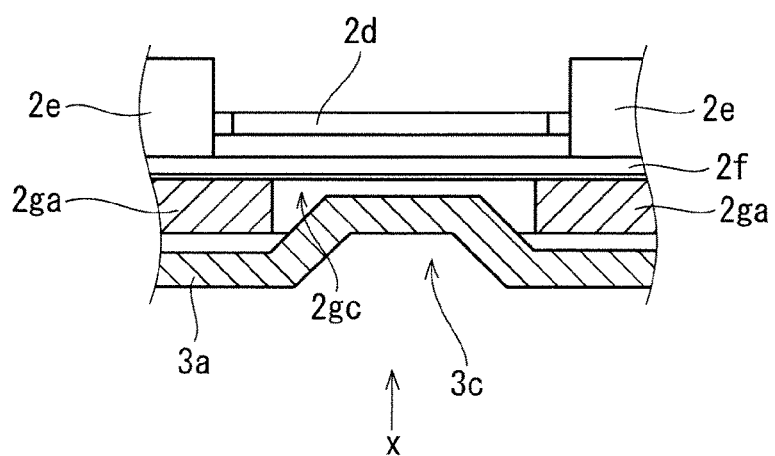
FIG. 3 is a cross-sectional view of the display device according to the first preferred embodiment along a line CD in FIG. 2.
Figure 4:
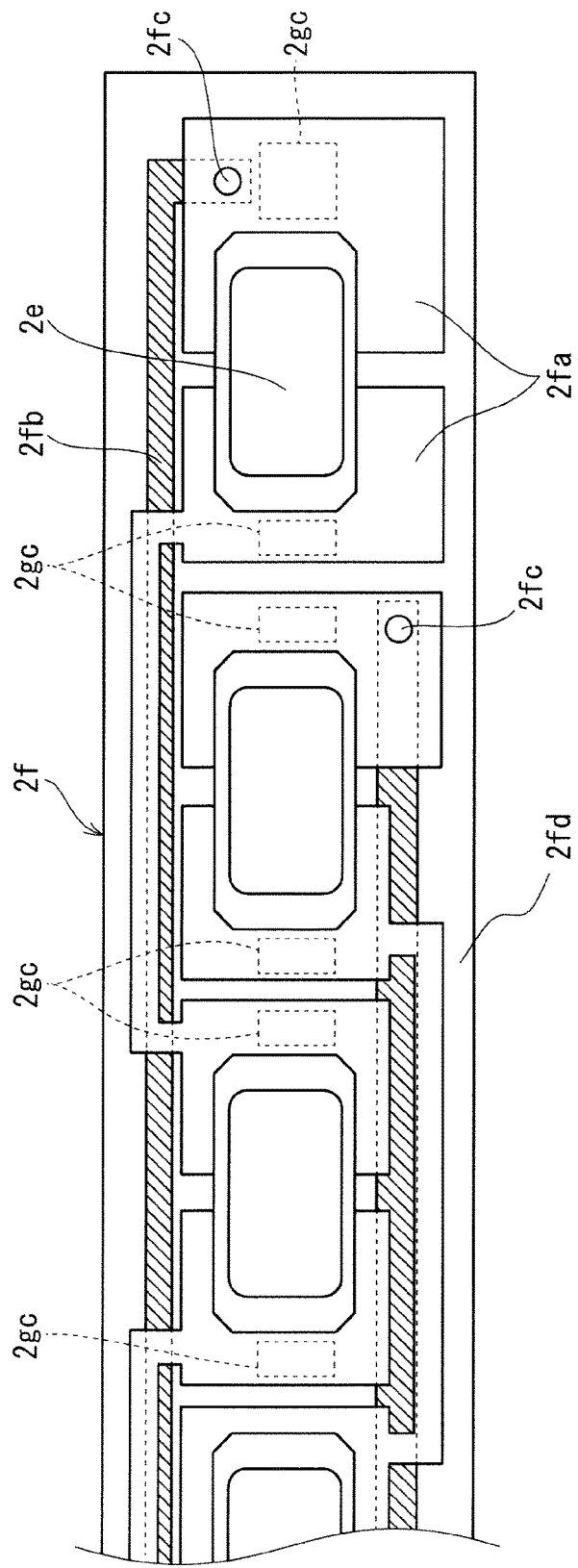
FIG. 4 is a plan view of a light source substrate included in the display device according to the first preferred embodiment.

Next, in the present first preferred embodiment, an engagement structure between the first housing 3 and the backlight 2 will be described. FIG. 2 is a cross-sectional view of the display device 100 in the present first preferred embodiment along a line AB in FIG. 1. While FIG. 1 shows an exploded state, FIG. 2 shows an assembled state. FIG. 3 is a cross-sectional view along a line CD in FIG. 2. Moreover, FIG. 4 is a plan view of the light source substrate 2f. In FIG. 2, the third housing 2a, the optical sheets 2b and the light-guiding plate 2c are omitted for simplification of the figure.

As shown in FIG. 2, the second housing 2g (i.e., the housing on the back surface side of the backlight 2) of the backlight 2 includes a back surface portion 2gb, and a first side wall portion 2ga protruded in a front surface direction of the backlight 2 from the back surface portion 2gb. As shown in FIG. 2, the light source substrate 2f is fixed to an inside of the first side wall portion 2ga. Here, the light source substrate 2f is stuck to the inside of the first side wall portion 2ga through an adhesive (e.g., an acrylic adhesive with high heat resistance). The first side wall portion 2ga is provided with openings 2gc. The openings 2gc are each provided at a position where it overlaps the light source substrate 2f fixed to the first side wall portion 2ga when seen from an x direction shown in FIGS. 2 and 3. Moreover, as shown in FIG. 2, the openings 2gc provided in the first side wall portion 2ga are provided away from the back surface portion 2gb.

The reflective sheet 2d is arranged to increase reflection efficiency on a front surface side (a light-emitting surface side) of the light source substrate 2f. As shown in FIG. 2, the reflective sheet 2d is arranged so as to cover not only an inner surface of the back surface portion 2gb but an inner surface of the first side wall portion 2ga. However, as shown in FIG. 3, in portions where the light sources 2e are arranged, openings are provided in the reflective sheet 2d.

As shown in FIGS. 2 and 3, the first housing 3 includes a front surface frame portion 3b and a second side wall portion 3a protruded in a back surface direction of the backlight 2 from the front surface frame portion 3b. In an inside of the second side wall portion 3a, projected portions 3c are provided. Fitting the projected portions 3c of the second side wall portion 3a into the openings 2gc of the first side wall portion 2ga allows the first housing 3 to be fixed to the second housing 2g. That is, the first housing 3 is fixed to the backlight 2.

Here, the projected portions 3 provided in the second side wall portion 3a each have a bridge shape. The bridge shape is formed by applying press working to the second side wall portion 3a, using a metal mold to cut and raise the second side wall portion 3a into the bridge shape.

A height (a depth of press) of each of the projected portions 3c of the second side wall portion 3a is a thickness of the first side wall portion 2ga of the second housing 2g or less. As the reason for this, if the projected portions 3c of the second side wall portion 3a exceed the thickness of the first side wall portion 2ga, the projected portions 3c will press the light source substrate 2f when the projected portions 3c are fitted into the openings 2gc. This may cause the light source substrate 2f stuck to the first side wall portion 2ga of the second housing 2g to be pressed and come off. Coming-off of the light source substrate 2f moves the light sources 2e to an unintended position, and there is a possibility of impairing display quality of the display device 100. Moreover, the projected portions 3c scrape a back surface of the light source substrate 2f, so that the adhesive applied to the back surface of the light source substrate 2f comes off and a foreign substance and the like are produced, which is unpreferable.

FIG. 4 is the plan view of the light source substrate 2f. In the light source substrate 2f, a first wiring pattern 2fa as an upper layer, and a second wiring pattern 2fb as a lower layer of the first wiring pattern 2fa are formed on a substrate made of, for example, glass epoxy resin. The second wiring pattern 2fb is a line that supplies electric power to the first wiring pattern 2fa, and the first wiring pattern 2fa and the second wiring pattern 2fb are connected to each other by through-holes 2fc. Anodes and cathodes of the light sources 2e (e.g., the point LED light sources) are connected to the first wiring pattern 2fa, for example, by solder.

An area of the first wiring pattern 2fa is made large. This is to positively transmit the heat radiated from the light sources 2e to the second housing 2g (e.g., aluminum or an aluminum alloy, which are high in heat conductivity). As shown in FIG. 4, in order to effectively transmit the generated heat of the light source 2e to the second housing 2g, the openings 2gc are desirably provided at positions where they do not overlap the light sources 2e.

A non-wiring portion 2fd (i.e., a portion where neither the first wiring pattern 2fa nor the second wiring pattern 2fb is formed) of the light source substrate 2f transmits the light. Thus, if the openings 2gc are provided so as to overlap the non-wiring portion 2fd, there is a possibility that the light of the light sources 2e leaks from the openings. Consequently, the openings 2gc are desirably provided so as to overlap the first wiring pattern 2fa, as shown in FIG. 4.

As described above, according to the present first preferred embodiment, the openings 2gc are provided in the first side wall portion 2ga of the second housing 2g, and the projected portions 3c are provided in the second side wall portion 3a of the first housing 3, corresponding to the positions of the openings 2gc. The projected portions 3c are fitted into the openings 2gc, by which the first housing 3 is fixed to the second housing 2g. That is, the first housing 3 is fixed to the backlight 2. Here, the light source substrate 2f is stuck and fixed to the inside of the first side wall portion 2ga of the second housing 2g. This can prevent the light from leaking to an outside of the display device 100, and foreign substances from entering from the outside of the display device 100, while keeping strength of the openings 2gc of the first side wall portion 2ga.

While in the foregoing, the engagement structure of the side surface where the light sources 2e are arranged has been described, the engagement structure can also be applied to side surfaces where the light sources 2e are not arranged. This can prevent foreign substances from entering from outside similarly to the above-described effects.

<Effects>

The display device 100 in the present first preferred embodiment includes the backlight 2, the display panel 1, and the first housing 3 containing the display panel 1 between the backlight 2 and itself, wherein the backlight 2 includes the light source substrate 2f on which the light sources 2e are mounted, the second housing 2g holding the light source substrate 2f, and the light-guiding plate 2c contained in the second housing 2g, the second housing 2g includes the back surface portion 2gb and the first side wall portion 2ga protruded in the front surface direction of the backlight 2 from the back surface portion 2gb, the light source substrate 2f is fixed to the inside of the first side wall portion 2ga, the openings 2gc are provided in the first side wall portion 2ga so as to overlap the light source substrate 2f fixed to the first side wall portion 2ga, the openings 2gc are provided away from the back surface portion 2gb, the first housing 3 includes the front surface frame portion 3b and the second side wall portion 3a protruded in the back surface direction of the backlight 2 from the front surface frame portion 3b, the projected portions 3c are provided in the inside of the second side wall portion 3a, and the projected portions 3c of the second side wall portion 3a are fitted into the openings 2gc of the first side wall portion 2ga, by which the first housing 3 is fixed to the second housing 2g.

Accordingly, the openings 2gc are provided in the second housing 2g, which is a housing on the back surface side of the backlight 2, and the projected portions 3c provided in the first housing 3 are fitted into the openings 2gc, which enables the first housing 3 to be fixed to the backlight 2.

Moreover, while in the present first preferred embodiment, the openings 2gc are provided in the first side wall portion 2ga so as to overlap the light source substrate 2f fixed to the first side wall portion 2ga, and the openings 2gc are provided away from the back surface portion 2gb. Thus, the light of the light sources 2e mounted on the light source substrate 2f can be restrained from leaking to the outside of the display device 100 from the fitting portions between the openings 2gc and the projected portions 3c.

Moreover, in the present first preferred embodiment, since the openings 2gc are provided in the first side wall portion 2ga so as to overlap the light source substrate 2f fixed to the first side wall portion 2ga, the strength of the portions of the openings 2gc of the first side wall portion 2ga can be kept by the light source substrate 2f.

Moreover, in the present first preferred embodiment, the openings 2gc are provided in the first side wall portion 2ga so as to overlap the light source substrate 2f fixed to the first side wall portion 2ga. Here, for example, when the light source substrate 2f is fixed to the first side wall portion 2ga with a bonding agent, the openings 2gc are closed by the light source substrate 2f without any gap, which can prevent foreign substances from entering the openings 2gc from the outside of the display device 100.

In the display device 100 in the present first preferred embodiment, the light source substrate 2f is formed with the wiring patterns (i.e., the first wiring pattern 2fa and the second wiring pattern 2fb), and the light sources 2e are electrically connected to the wiring patterns, and the openings 2gc overlap one of the wiring patterns of the light source substrate 2f.

Accordingly, in the case where the wiring patterns are formed of metal, the wiring patterns are hard to transmit the light, and thus, providing the openings 2gc at the positions where they overlap the wiring pattern can restrain the light leakage from the openings 2gc.

Moreover, in the display device 100 in the present first embodiment, the openings 2gc do not overlap the light sources 2e.

Accordingly, providing the openings 2gc at the positions where they do not overlap the light sources 2e enables the heat emitted from the light sources 2e to be efficiently transmitted to the second housing 2g.

Moreover, in the display device 100 in the present first preferred embodiment 1, the projected portions 3c are formed by applying press working to the second side wall portion 3a of the first housing 3.

Accordingly, applying the press working to the second side wall portion 3a of the first housing 3 enables the projected portions 3c to be formed. Forming the projected portions 3c by the press working makes unnecessary a structure for joining the projected portions 3c to the second side wall portion 3a (a bonding agent, screws or the like), as compared with a case where the projected portions 3c are provided as separate members. Thus, when the first housing 3 and the second housing 2g are engaged, a gap between the housings can be made smaller.

Moreover, in the display device 100 in the present first preferred embodiment, the shape of each of the projected portions 3c is the bridge shape.

Accordingly, forming each of the projected portions 3c into the bridge shape enables the projected portion 3c to be formed relatively easily by the press working.

Second Preferred Embodiment

Figure 5:
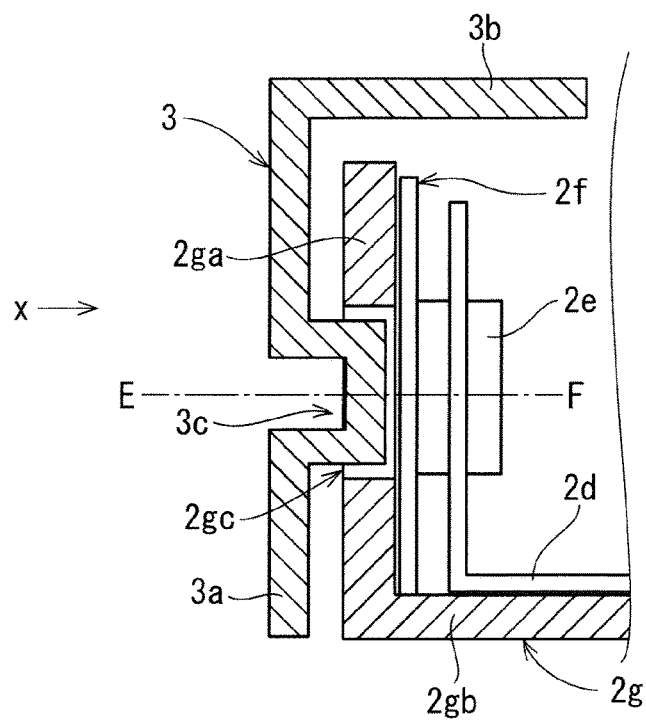
FIG. 5 is a cross-sectional view of a display device according to a second preferred embodiment along the line AB in FIG. 1.
Figure 6:
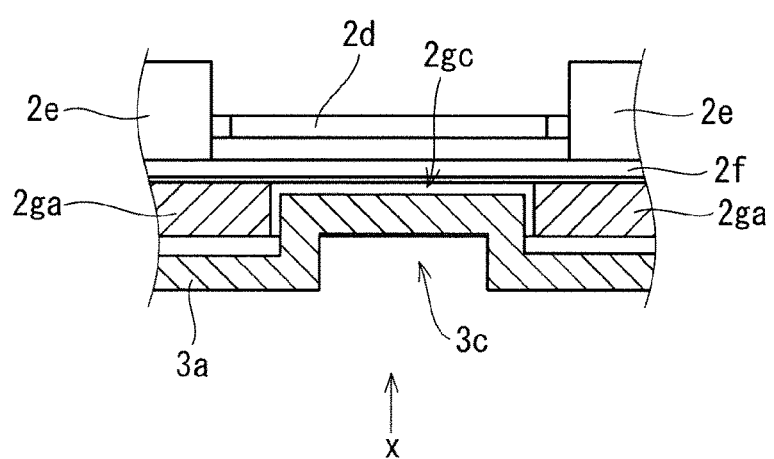
FIG. 6 is a cross-sectional view of the display device according to the second preferred embodiment along a line EF in FIG. 5.

Hereinafter, a display device according to a second preferred embodiment is defined as a display device 200. FIG. 5 is a cross-sectional view of the display device 200 in the present second preferred embodiment along the line AB in FIG. 1. While FIG. 1 shows the exploded state, FIG. 5 shows an assembled state. FIG. 6 is a cross-sectional view along a line EF in FIG. 5.

In the present second preferred embodiment, as shown in FIGS. 5 and 6, projected portions 3c provided in a second side wall portion 3a of a first housing 3 are formed by drawing press. In the present second preferred embodiment, each of the projected portions 3c, being formed by the drawing press, does not have a cutout as with each of the bridge-shaped projected portions 3c in the first preferred embodiment. The other configurations are the same as those in the first preferred embodiment, and thus, descriptions are omitted.

In the present second preferred embodiment, openings 2gc of a second housing 2g into which the projected portions 3c provided in the first housing 3 are fitted are provided at positions where they overlap a light source substrate 2f when seen from an x direction in FIGS. 5 and 6, as in the first preferred embodiment.

<Effects>

In the display device 200 in the present second preferred embodiment, the projected portions 3c are formed by drawing.

Accordingly, since each of the projected portions 3c in the present second preferred embodiment does not have an opening portion such as the cutout, the robust engagement structure excellent in impact resistance can be obtained. Moreover, in the present second preferred embodiment, each of the projected portions 3c, being formed by drawing, does not have the opening portion such as the cutout. This allows the openings 2gc provided in the second housing 2g to be efficiently closed. Thus, light of light sources 2e can be restrained from leaking to an outside of the display device 200 from fitting portions between the openings 2gc and the projected portions 3c. Moreover, foreign substances can be more surely prevented from entering the openings 2gc from the outside of the display device 200.

Third Preferred Embodiment

Figure 7:
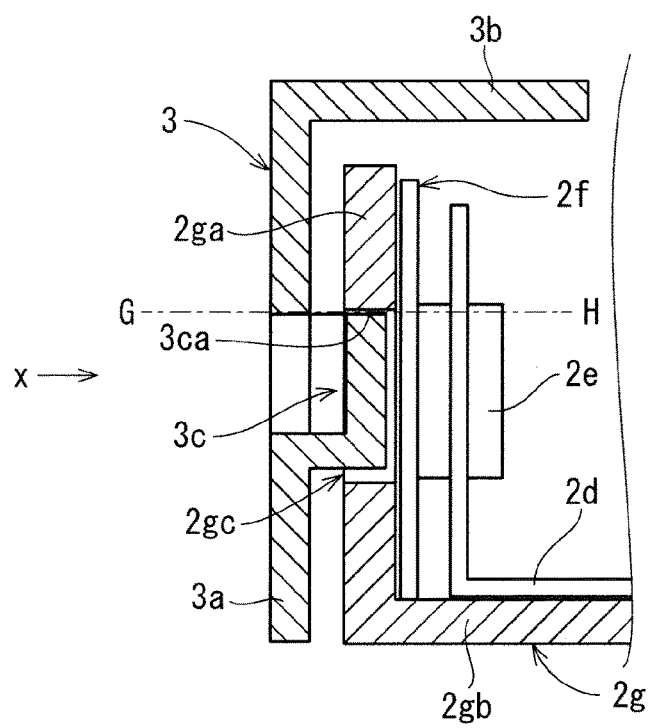
FIG. 7 is a cross-sectional view of a display device according to a third preferred embodiment along the line AB in FIG. 1.
Figure 8:
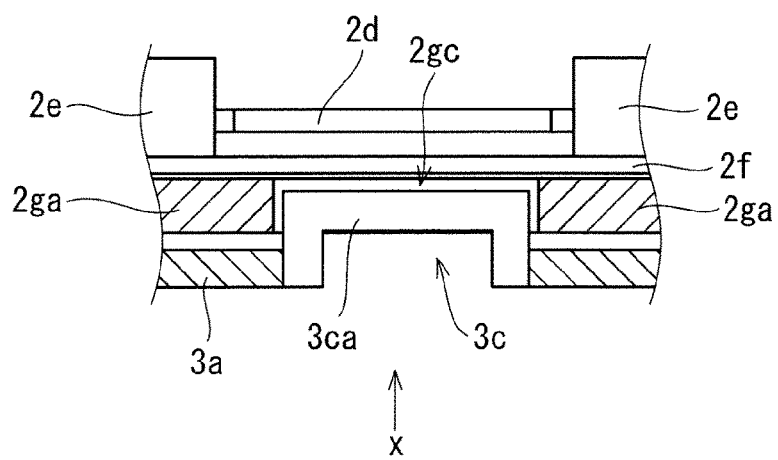
FIG. 8 is a cross-sectional view of the display device according to the third preferred embodiment along a line GH in FIG. 7.

Hereinafter, a display device according to a third preferred embodiment is defined as a display device 300. FIG. 7 is a cross-sectional view of the display device 300 in the present third preferred embodiment along the line AB in FIG. 1. While FIG. 1 shows the exploded state, FIG. 7 shows an assembled state. FIG. 8 is a cross-sectional view along a line GH in FIG. 7.

In the present third preferred embodiment, as shown in FIGS. 7 and 8, projected portions 3c provided in a second side wall portion 3a of a first housing 3 each include a shear plane 3ca. The projected portions 3c in the present third preferred embodiment are formed by drawing press. When the drawing press is performed, punching is performed to the shear plane 3ca so as to form the shear plane 3ca.

In the present third preferred embodiment, openings 2gc of a second housing 2g into which the projected portions 3c provided in the first housing 3 are fitted are provided at positions where they overlap a light source substrate 2f when seen from an x direction in FIGS. 7 and 8, as in the first preferred embodiment or the second preferred embodiment. The other configurations are similar to those of the second preferred embodiment, and thus, descriptions thereof are omitted.

<Effects>

In the display device 300 in the present preferred embodiment, the projected portions 3c each include the shear plane 3ca, and the shear plane 3ca is fitted into each of the openings 2gc.

Accordingly, the shear planes 3ca of the projected portions 3c are each hooked at an end portion of the opening 2gc of the second housing 2g with a strong force, which can provide an engagement structure more excellent in impact resistance than that in the second preferred embodiment.

Fourth Preferred Embodiment

Figure 9:
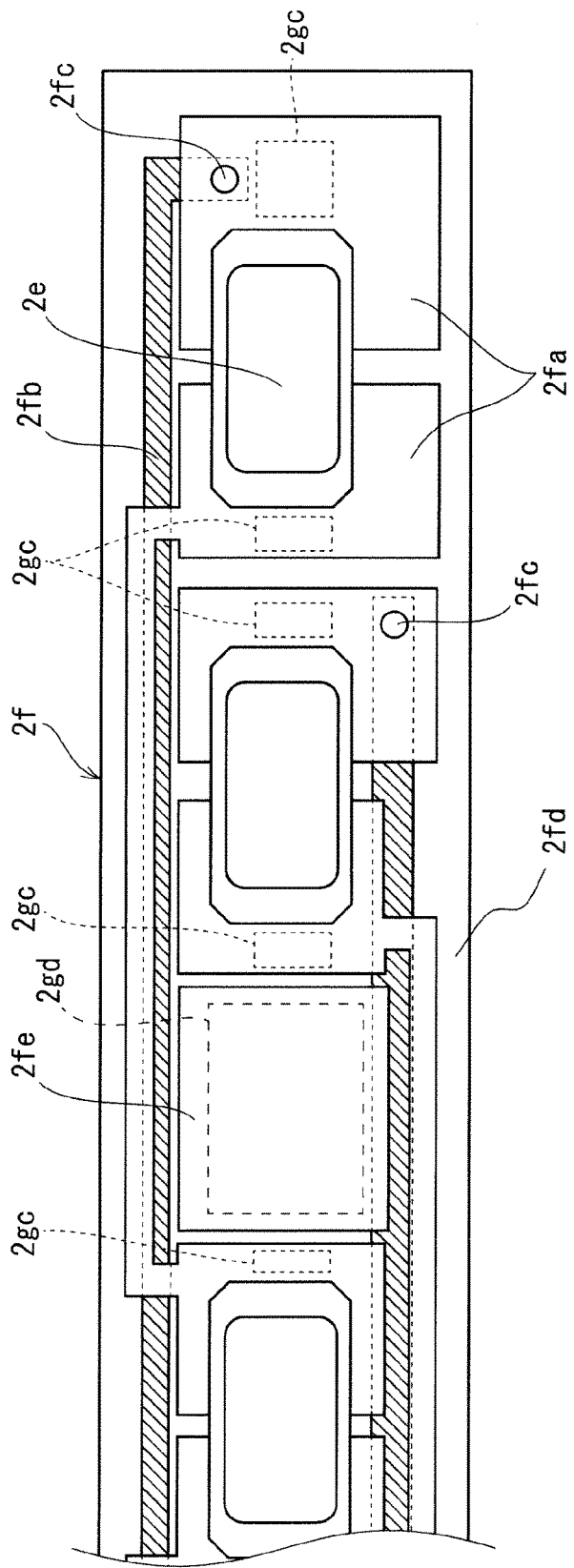
FIG. 9 is a plan view of a light source substrate included in a display device according to a fourth preferred embodiment.

FIG. 9 is a plan view of a light source substrate 2f included in a display device 400 in the present preferred embodiment. In the first preferred embodiment, the openings 2gc are provided at the positions where they overlap the first wiring pattern 2fa of the light source substrate 2f, and do not overlap the light sources 2e. In the present preferred embodiment, as shown in FIG. 9, an opening 2gd is provided at a position where it does not overlap a first wiring pattern 2fa. In this case, a light-shielding layer 2fe of enough size to close the opening 2gd is provided at a position of the light source substrate 2f where the light source substrate 2f overlaps the opening 2gd. A projected portion 3c to be fitted into the opening 2gd is provided in a second side wall portion 3a of a first housing 3. The projected portion 3c in the present preferred embodiment is the projected portion 3 described in any one of the first to third preferred embodiments.

<Effects>

In the display device 400 in the present preferred embodiment, the light source substrate 2f is provided with the light-shielding layer 2fe in the portion where the light source substrate 2f and the opening 2gd overlap each other.

Accordingly, even when the opening 2gd is provided at the position where it does not overlap the first wiring pattern 2fa provided on the light source substrate 2f, providing the light-shielding layer 2fe of enough size to close the opening 2gd in the light source substrate 2f can prevent the light of the light sources 2e from leaking from the opening 2gd.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
a backlight;
a display panel; and
a first housing containing said display panel between said backlight and the first housing, wherein
said backlight comprises:
   a light source substrate on which a light source is mounted;
   a second housing that holds said light source substrate; and
   a light-guiding plate contained in said second housing,
said second housing comprises a back surface portion and a first side wall portion protruded in a front surface direction of said backlight from said back surface portion,
said light source substrate is fixed to an inside of said first side wall portion,
an opening is provided in said first side wall portion so as to overlap said light source substrate fixed to said first side wall portion,
said opening is provided away from said back surface portion,
said first housing comprises a front surface frame portion and a second side wall portion protruded in a back surface direction of said backlight from said front surface frame portion,
a projected portion is provided in an inside of said second side wall portion,
said projected portion of said second side wall portion is fitted into said opening of said first side wall portion, by which said first housing is fixed to said second housing,
a wiring pattern is formed in said light source substrate, and said light source is electrically connected to the wiring pattern,
said opening overlaps said wiring pattern of said light source substrate, and
said opening does not overlap said light source.

2. A display device comprising:
a backlight;
a display panel; and
a first housing containing said display panel between said backlight and the first housing, wherein
said backlight comprises:
   a light source substrate on which a light source is mounted;
   a second housing that holds said light source substrate; and
   a light-guiding plate contained in said second housing,
said second housing comprises a back surface portion and a first side wall portion protruded in a front surface direction of said backlight from said back surface portion,
said light source substrate is fixed to an inside of said first side wall portion,
an opening is provided in said first side wall portion so as to overlap said light source substrate fixed to said first side wall portion,
said opening is provided away from said back surface portion, said first housing comprises a front surface frame portion and a second side wall portion protruded in a back surface direction of said backlight from said front surface frame portion, a projected portion is provided in an inside of said second side wall portion, said projected portion of said second side wall portion is fitted into said opening of said first side wall portion, by which said first housing is fixed to said second housing, and said opening does not overlap said light source.

3. The display device according to claim 1, wherein said light source substrate is provided with a light-shielding layer in a portion where said light source substrate and said opening overlap each other.

4. The display device according to claim 1, wherein said projected portion is formed by applying press working to the second side wall portion of said first housing.

5. The display device according to claim 4, wherein a shape of said projected portion is a bridge shape.

6. The display device according to claim 1, wherein said projected portion is formed by drawing.

7. The display device according to claim 1, wherein said projected portion includes a shear plane, and the shear plane is fitted into said opening.

* * * * *